INVENTORS
CARL W. RAETZSCH
JOHN F. VAN HOOZER
HUGH CUNNINGHAM
BY
Chisholm and Spencer
ATTORNEYS

METHOD AND APPARATUS HAVING MULTIPLE-TIERED MERCURY CATHODE ELECTROLYSIS CELLS

INVENTORS
CARL W. RAETZSCH
JOHN F. VAN HOOZER and
HUGH CUNNINGHAM
BY Chisholm and Spencer
ATTORNEYS INVENTORS
CARL W. RAETZSCH
JOHN F. VAN HOOZER and
HUGH CUNNINGHAM
BY
Chisholm and Spencer
ATTORNEYS INVENTORS
CARL W. RAETZSCH
JOHN F. VAN HOOZER and
HUGH CUNNINGHAM
BY
Chisholm and Spencer
ATTORNEYS INVENTORS
CARL W. RAETZSCH
JOHN F. VAN HOOZER and
HUGH CUNNINGHAM
BY
Chisholm and Spencer
ATTORNEYS INVENTORS
CARL W. RAETZSCH
BY JOHN F. VAN HOOZER and
HUGH CUNNINGHAM
Chisholm and Spencer
ATTORNEYS INVENTOR.
CARL W. RAETZSCH
JOHN F. VAN HOOZER and
HUGH CUNNINGHAM
BY
Chisholm and Spencer
ATTORNEYS

INVENTORS
CARL W. RAETZSCH
JOHN F. VAN HOOZER &
HUGH CUNNINGHAM

BY Chisholm and Spencer
ATTORNEYS

INVENTORS
CARL W. RAETZSCH
JOHN F. VAN HOOZER &
HUGH CUNNINGHAM
BY
Chisholm and Spencer
ATTORNEYS United States Patent Office 3,650,919

Patented Mar. 21, 1972

3,650,919

METHOD AND APPARATUS HAVING MULTIPLE-TIERED MERCURY CATHODE ELECTROLYSIS CELLS

Carl W. Raetzsch, John F. Van Hoozer, and Hugh Cunningham, Corpus Christi, Tex., assignors to PPG Industries, Inc., Pittsburgh, Pa.

Continuation-in-part of application Ser. No. 410,579, Nov. 12, 1964. This application July 8, 1969, Ser. No. 842,816

Int. Cl. C01d *1/08;* C22d *1/04*

U.S. Cl. 204—99 18 Claims

ABSTRACT OF THE DISCLOSURE

Method and apparatus for alkali metal chloride electrolysis in multiple-tiered electrolysis cells of the mercury cathode type. The cells are arranged to enable brine electrolyte to flow across the mercury cathode flow in the individual, as well as in the plurality of cells.

CROSS-REFERENCE TO RELATED APPLICATION

This is a continuation-in-part of patent application Ser. No. 410,579, filed Nov. 12, 1964, now abandoned.

BACKGROUND OF THE INVENTION

The present invention relates to electrolytic cells. More particularly, the present invention relates to electrolytic cells for the electrolysis of alkali metal chloride solutions. Still more particularly, the present invention relates to electrolytic cells for the electrolysis of alkali metal chloride solutions of the flowing mercury cathode type.

In the manufacture of elemental chlorine and caustic soda by the electrolysis of alkali metal chloride solutions, it has become increasingly important that caustic soda of high purity be obtained during such electrolysis. This is particularly true with respect to caustic soda produced for use in the textile industry, and thus in recent years, demand for high grade, iron-free caustic soda has increased tremendously. Caustic soda with these qualifications can be made directly in electrolytic cells having a flowing mercury cathode. While diaphragm cell caustic can be purified to a satisfactory extent for use in the textile industry, purification procedures are costly and complicated, giving rise to an increased demand for caustic soda produced in the flowing mercury cathode cell where the need for such complicated and expensive purification systems is not existent. For this reason, the trend in the chlorine-alkali industry for the past several years has been to manufacture more and more chlorine and caustic soda in mercury cells as opposed to diaphragm cells.

Normally mercury cells operate at slightly higher voltages than diaphragm cells. This higher voltage is due in part to the fact that they are operated at high current densities. High current densities are employed to utilize the cell anodes to a maximum degree since they require a considerable quantity of floor space. Mercury cells require a flowing mercury cathode. Anodes are typically positioned above this cathode to provide an electrolytic surface for decomposing brine which is caused to flow between the anode and cathode. Thus, the minimum cell room floor space required for a given cell is at least equal to the area of the anode of the cell utilized. Since the cells themselves are relatively large in comparison to diaphragm cells, mercury cell installations often require excessively large cell room space in which to operate.

THE PRESENT INVENTION

In accordance with the present invention, a novel electrolytic alkali metal-chlorine cell is provided which requires a minimum amount of floor space for successful operation and provides an extremely large electrolytic surface area for electrolysis to take place per unit area of floor space. None of the anode adjustments typically encountered in mercury cell operation are required with this cell. In addition, the cell may be operated at lower current densities then conventional mercury cells without suffering the penalty of excessive floor space requirements while achieving high productivity per cell. This, of course, reduces electrical energy consumption. Bus bar requirements for electrical connection to the cells of this invention are drastically reduced over those necessary for a conventional mercury cell circuit. Further, piping requirements for feed to the cell and removal of product are minimized.

For a more complete understanding of the present invention, reference is made to the accompanying drawings in which.

Figure 1:
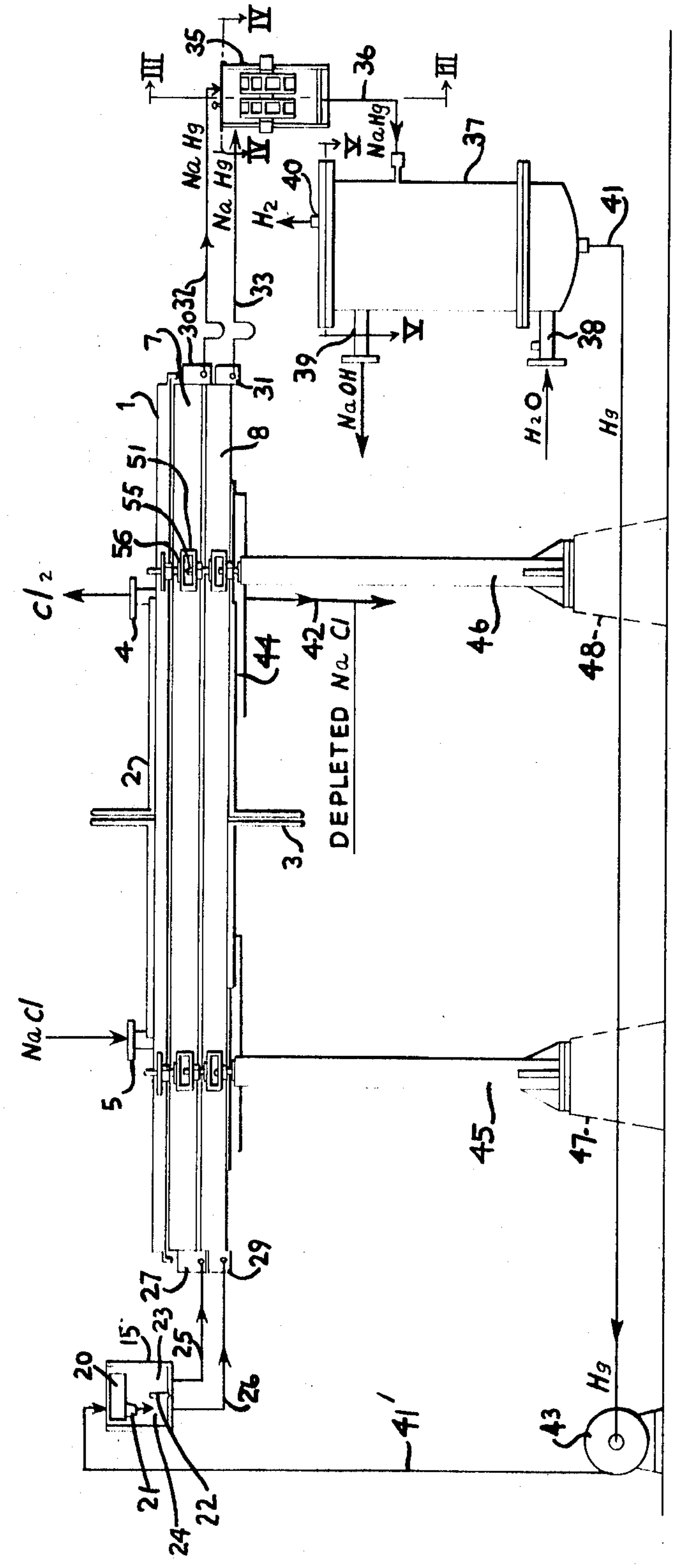
FIG. 1 represents a side elevation of the bipolar mercury cell of the instant invention showing an anode half cell, a cathode half cell, and an intermediate cell unit having an anode and a cathode disposed between the top half cell and the bottom half cell of the bipolar mercury cell shown.
Figure 2:
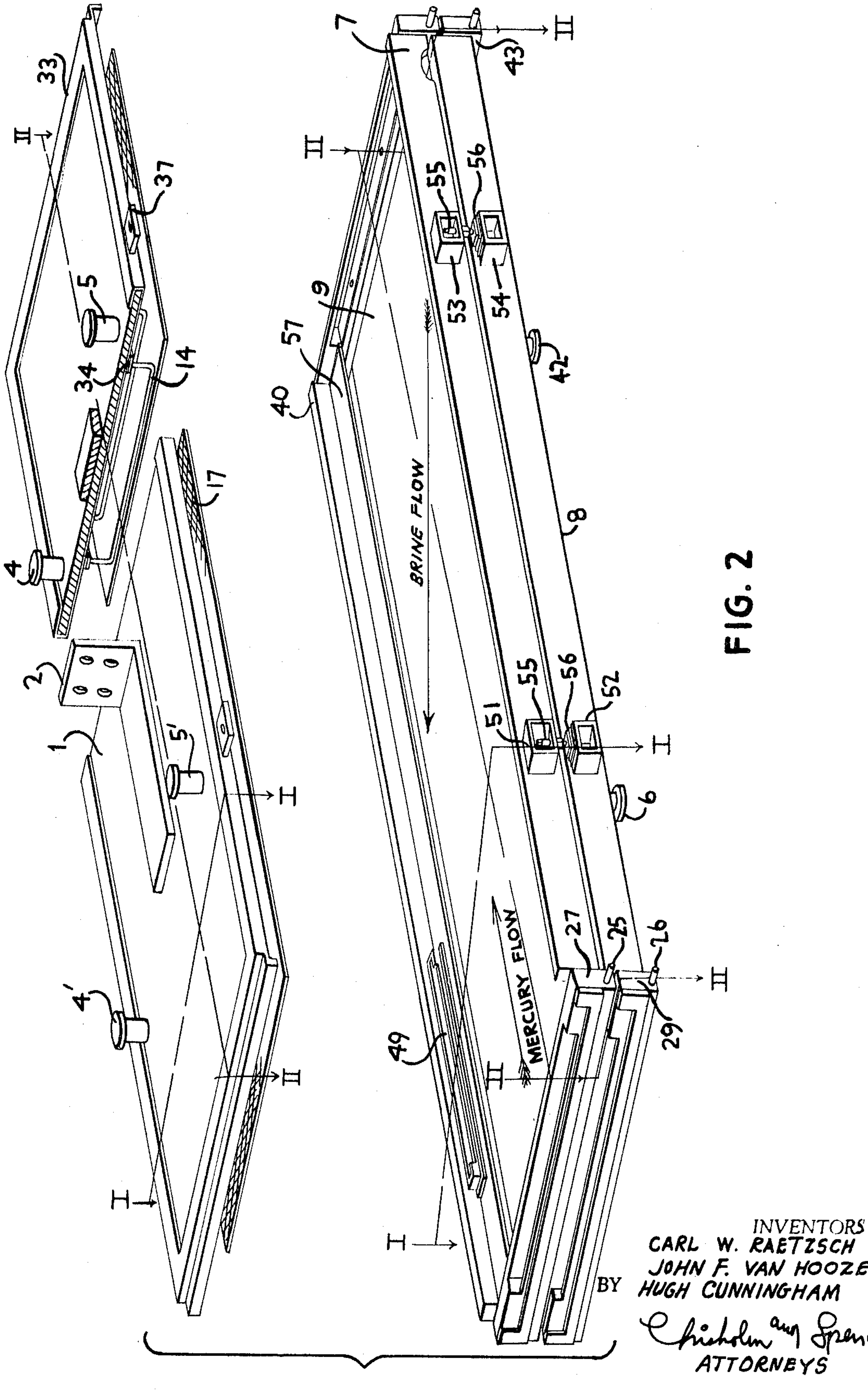
FIG. 2 is a plan view, partially in perspective, with the cover broken away to show the anode member of the anode half cell and the cathode tray or surface of the intermediate cell unit positioned above the cathode of the bottom half cell, and indicating the flow of brine and mercury.

Turning now to the drawings, with particular reference to FIGS. 1, 2, 3, and 4, there is shown a bipolar flowing mercury cathode alkali-chlorine cell in which, for illustrative purposes, two cells have been shown. As seen in FIG. 1, the cells are composed of an upper anode containing cover member or anode half cell 1 and a cathode containing bottom member or cathode half cell 8. Intermediate the cover member 1 and the bottom member 8 is disposed a bipolar cell unit generally indicated as 7 which contains on its upper surface a tray 9 for the reception of the mercury cathode and on its bottom side an anode 10 to be used in conjunction with the mercury contained in tray 11 of the bottom member 8. The cover member 1 is lined with a suitable insulating material such as rubber and the lining 6 protects the underside of the cover 1 and electrically insulates it partially from the cell unit 7 placed below it. The cover member 1 is composed of a back-up plate 12 of steel or other suitable electrically conductive structural metal. The backer plate 12*a* contains tapped holes 18 and 18' (see FIG. 3) which are plugged on their upper surface with plugs 19 and 19' and contain within the holes bolts 34 and 34'. The plugs 19 and 19' may be omitted if desired. Operation of the cell without plugs 19 and 19' has been accomplished and some slight improvement in electrical conductivity observed with no deleterious effects encountered. In such an operation the bolts become covered with mercury which apparently assists in conducting current through the bolts from the cell above. These bolts are affixed to and hold in place against the back plate 12*a* titanium sheathed electrically conductive rod member 13*a* preferably constructed of copper or aluminum. The titanium sheath 14 is intimately affixed to the rod member by suitable binding material or mechanically attached by compression against the rod so that maximum electrical conductivity between the two metals is realized. The anode 17 of the cell cover 1 is affixed to the titanium sheath 14 such as by welding and when in place is positioned above the tray 9 of the cell unit 7. Affixed to the outer surface of the cover member 1 is a suitable bus-connector 2 which, during operation of the cell, is suitably bolted to the cell room bus bars (not shown). Several orifices are shown in the cover member of the cell, which orifices are utilized for the performance of certain functions. Thus, in FIG. 2, two orifices 4 and 4' are shown which are utilized as chlorine gas collection points or conduits. Orifices 5 and 5' are utilized for the introduction of brine into the cell, as indicated in FIGS. 1 and 2.

In the over-all operation of the cell, as seen looking at FIG. 1, mercury is introduced into the cell by dropping it into the mercury splitting device 15. The mercury splitting device 15 contains a rotating member generally indicated at 20 which rotates on a vertical axis and has a nozzle member 21 attached on the undersurface thereof which constantly emits a flowing stream of mercury. As the device rotates, it passes a dividing member 22 and the mercury is divided into two separate reservoirs 23 and 24. The contents of reservoir 23 are fed through line 25 to a mercury distributor 27. The contents of reservoir 24 are fed through line 26 to a mercury distributor 29. The mercury passes from distributors 27 and 29 across the faces of the trays 9 and 11 respectively (see FIG. 4) and flows to the opposite end of the cell. Brine is continuously introduced through brine feed inlets 5 and 5' during this operation and passes from the upper tray 9 to the lower tray 11 in a manner to be described hereinafter. Current is applied to the cell and electrolysis takes place between the face of the anodes 17 and 10 and the surface of the mercury cathode flowing across the cell in trays 9 and 11. Elemental chlorine formed during the electrolysis is removed from the cell through chlorine outlets 4 and 4' in a manner to be described hereinafter. Sodium-mercury amalgam is formed during the electrolysis on the flowing mercury cathode as it passes across the cell and is collected in the cell in the collection sumps 30 and 31. Thus, the contents of tray 11 collect in sump 31 and those of tray 9 in sump 30. The amalgam in sump 30 is introduced into an amalgam splitter 35 through line 32. The amalgam in sump 31 is introduced into splitter 35 through line 33. After passing through the splitter, the amalgam is passed through line 36 to the mercury denuder 37. In the denuder 37 the amalgam is contacted with water introduced through line 38, and the caustic soda product is removed through line 39. Hydrogen evolved during the denuding operation is removed from the denuder through line 40. The denuded mercury is removed through line 41 and is pumped by means of pump 43 through line 41' to the mercury feed splitter 15, and the process is repeated. Depleted brine is removed from the cell through line 42 after having collected in sump 44. It is, of course, to be understood that the depleted brine removed from the cell may be resaturated and utilized once more in the cell in accordance with conventional practices in the art. The cell is supported on posts 45 and 46 which are anchored to the floor of the cell room on footers 47 and 48.

Figure 5:
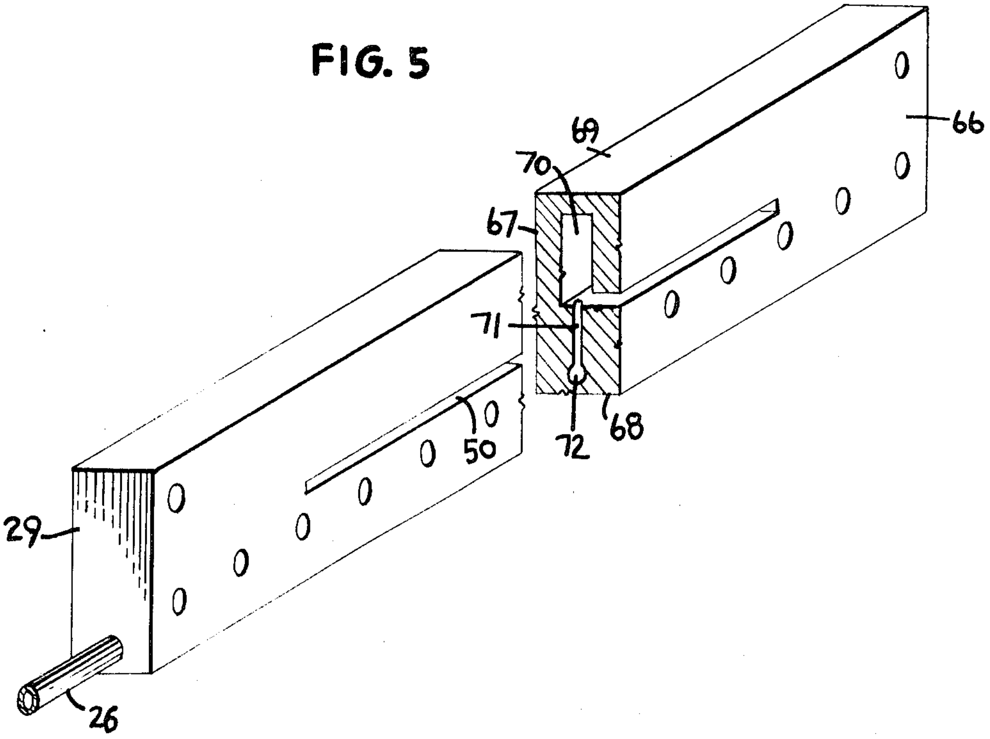
FIG. 5 is a perspective view partially in section of the mercury inlet 29 of the bottom half cell of the cell assembly shown in FIG. 2.

In accordance with the teachings of this invention, the mercury flows in a longitudinal direction across the cell, as shown in FIG. 2. Preferably the brine flows at a transverse angle to the flow of mercury in the first cell unit to a brine down-comer 49. This brine then reverses its flow on the next lower tray and flows in the opposite direction, but still at a transverse angle, to the flow of mercury in that tray. The mercury flow in all the trays is preferably in the same direction. Thus, as shown in FIGS. 2 and 5, the mercury introduced through lines 25 and 26 enters mercury feed distributors 27 and 29, respectively. As shown in more detail in FIG. 5, which is an enlarged perspective view of the mercury feed distributor 29, this unit contains an elongated slot 50 on its side so that the mercury, when it reaches the level of the slot, flows out of the distributor and across the tray 11 associated with that distributor. An identical configuration of the mercury distributor is contained in the unit 27 of FIG. 2 so that the slotted device constantly provides a film of mercury across the tray 9 with which that distributor is associated. As will be understood by those skilled in the art, the trays themselves are tilted downwardly from the mercury feed point to the collection point or sumps 30 and 31 so that the mercury will flow by gravity from the feed point to the sumps or collection points 30 and 31. Located on the side of the trays between each cell tray are housings 51, 52, 53, and 54. Contained in each of these housings is an adjusting screw element 55 which rests on an insulated member 56 of the unit immediately below. Suitable electrical insulation, such as micarta, may be employed for this purpose so long as it provides adequate insulation to prevent shorting caused by the differences in potential between the various cell units associated with each of the housing members. These adjustable screw elements are utilized to provide a proper slope for the flowing mercury between the various cell units employed and to provide a means for adjusting the level of the mercury across the width of the cell to thereby insure uniform distribution of mercury across the width of the cell.

Figure 3:
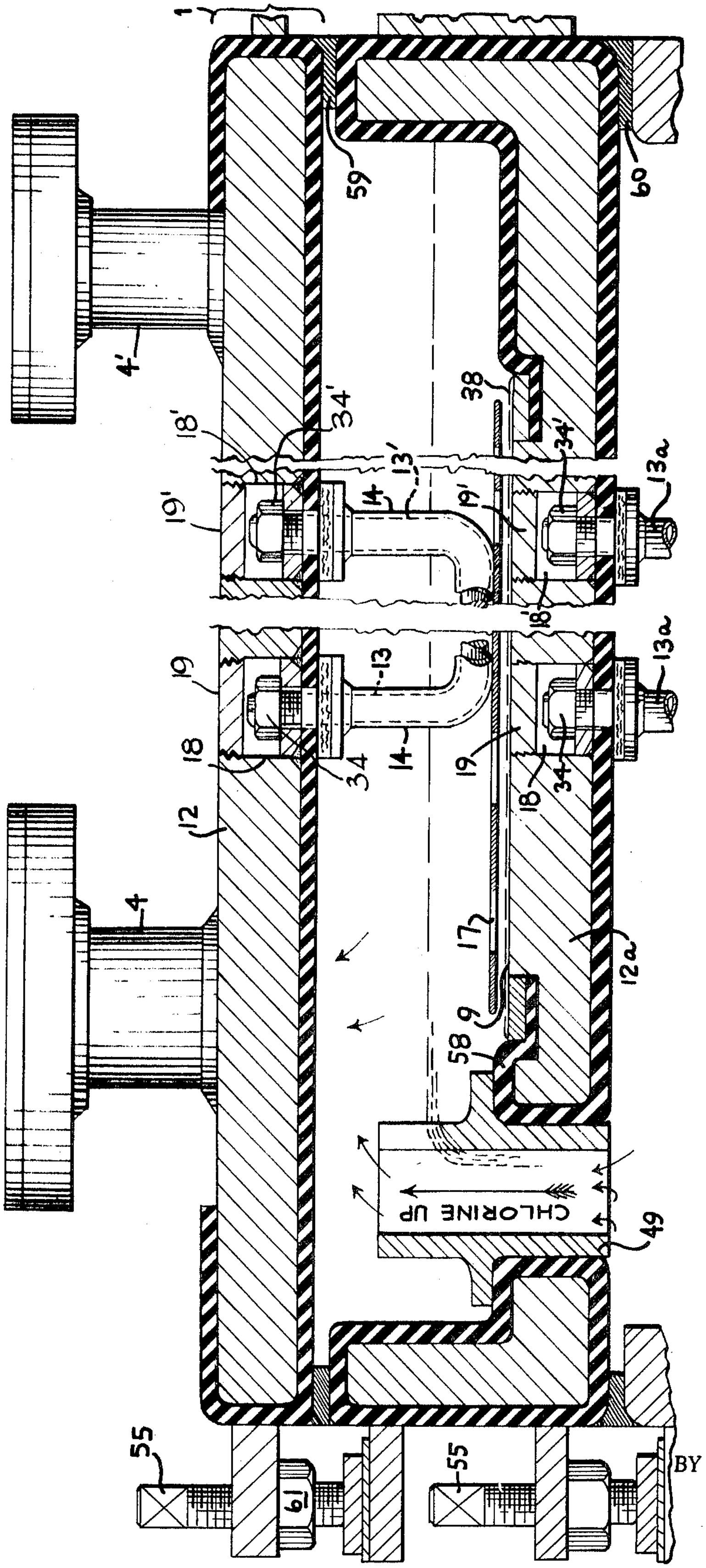
FIG. 3 is a cross-section of the cell of FIG. 2 taken along lines I—I of FIG. 2, the center section being partially omitted, showing the chlorine outlet and one modification of the anode attachment and electrical connection to the anode.

Turning now to FIG. 3, the details of the construction and the electrical connection to the cell anodes can be readily seen. In FIG. 3 there is shown the cell cover member generally indicated as 1 which shows two drilled holes 18 and 18' in the back-up plate 12 suitably plugged with plug members 19 and 19'. Located immediately below the plug are bolt elements 34 and 34' which have affixed thereto rod members 13 and 13', preferably constructed of copper and sheathed in a titanium tube or sheath 14 and 14', respectively. The copper rods encased in titanium are sheaths curved at the bottom into a flat member which is welded to a platinized titanium anode member 17. Thus, the titanium encased copper rods serve as support members for the anode 17 as well as means for distributing current thereto. The mercury contained within the cell, generally indicated by the numeral 38, flows beneath the anode member 17 on a steel tray 9 which, at its peripheral edges, is bonded to a rubber lining 58 of the cell unit 7. The base member 12*a* of the tray 9 serves as the back plate for the next anode and conducts the electrical current from the cathode of the first cell to the current distributor 13*a* of the next adjacent cell unit which is located immediately below it and like rod 13 is also encased in a titanium sheath. The insulation 58 and the presence of gasket 60 serves to protect the cell above from shorting out with the cell below. The chlorine from the bottom cell rises up through the brine down-comer 49 as brine from the upper tray falls downwardly through the down-comer 49 in countercurrent contact therewith. Gaseous chlorine ultimately escapes from the cell through outlet 4 located in the cover member 1 of the cell. While in the drawing of FIG. 3 only a single unit of attachment to the cell anode is shown, it is, of course, understood that a plurality of these units extend across the cell to provide adequate support for the flat platinized titanium anode and prevent it from warping during operation. A gasket 59 is placed between the cover member or upper anode containing member of the cell and the tray 9, and a similar gasket 60 is located between the cell unit 7 and the bottom 8 of the cell. These gaskets serve to insulate and seal one cell from the other during operation. To the side of the cell and underneath the adjusting screw member 55 is a nut 61 which is affixed in place when proper adjustment of the slope of the cell trays has been made.

Figure 4:
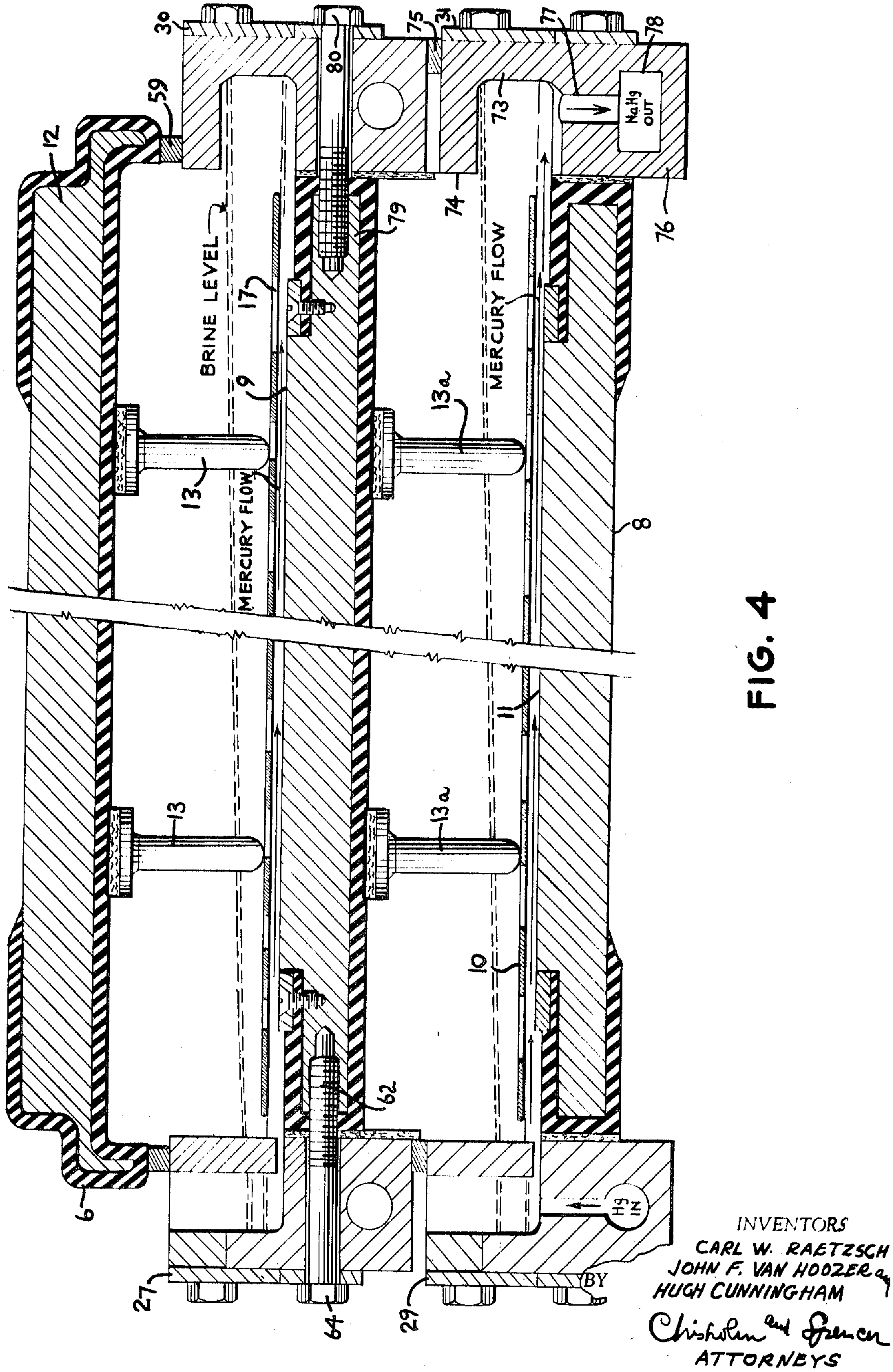
FIG. 4 is a cross-section of the cell taken along lines II—II of FIG. 2, the center section being partially omitted, showing the anode half cell of the cell assembly, the cathode half cell of the cell assembly, and the intermediate cell unit, and showing in detail the mercury inlet and outlet and the relationship of the brine and the mercury within the cell.

Turning to FIG. 4, there is shown the relationship of the electrical support members or rods 13 to the anodes 17, as well as the relationship of rods **13*a* to the cell unit anode 10. In addition, the positioning of the mercury feed reservoirs 27 and 29 and the mercury-amalgam sumps 30 and 31 of the cell are also depicted. The mercury cell distributers 27 and 29 are bolted to the ends of each tray by suitable tapped bore holes 62 in the cell trays 9 and 11, respectively. These tapped bore holes 62 are provided with bolt elements 64 and the entire units are thus bolted to the cell trays 9 and 11**.

As shown in FIGS. 4 and 5, the mercury distributor 29 consists of two side members 66 and 67; a bottom member 68 and a top member 69 which define a hollow cavity 70. The side member 66 which abuts against the cell tray 11 is slotted at 50 on its long axis so as to be open to the tray 11 with which this distributor 29 is associated. The distributor 29 is also provided with a slotted channel 71 in the vertical direction which channel 71 communicates with the long axis slot 50, and a cavity 72 at the bottom end. Cavity 72 runs parallel to slot 50 along the long axis of the distributor 29. Thus, mercury introduced through line 26 into the cavity 72 traversing the long axis of the distributor 29 rises through the vertical slot or channel 71 to the chamber 70 and from there, by virtue of the slot 50 communicating with the tray 11, mercury is introduced into the cell tray 11 and flows across the tray and the face of the anode 10 placed above the tray. If desired, cavity or channel 72 may be provided with a plurality of drilled holes in lieu of the vertical channel 71 so that a plurality of spaced channels are provided instead of a unitary slot. Similarly channel 72 may be a pipe having a plurality of openings on its upper surface at spaced intervals which communicate with a plurality of spaced vertical holes. Such spaced holes would of course terminate in the chamber 70 in this case as does the vertical slot 71. The mercury, as mercury amalgam, as it reaches the opposite end of the cell, enters the sump 31 formed by the side 73, top member 74, and bottom member 76. The mercury, as it enters this chamber, settles through a vertical slot 77 into a small reservoir member 78 and is ultimately removed from the cell. This mercury collection or amalgam collection member or sump 31 is affixed to the side of the cell as sump 30 is attached. Sump 30 is provided with a tapped bore hole 79 located in the tray 9 and by utilizing suitable bolts 80 is affixed to tray 9. The mercury distributor 27 is of identical construction to the reservoir 29 hereinabove described but as will be obvious, it is associated with tray 9. Similarly, the sump 30 is identical in construction to the sump 31 described above but is associated with tray 9.

Figure 10:
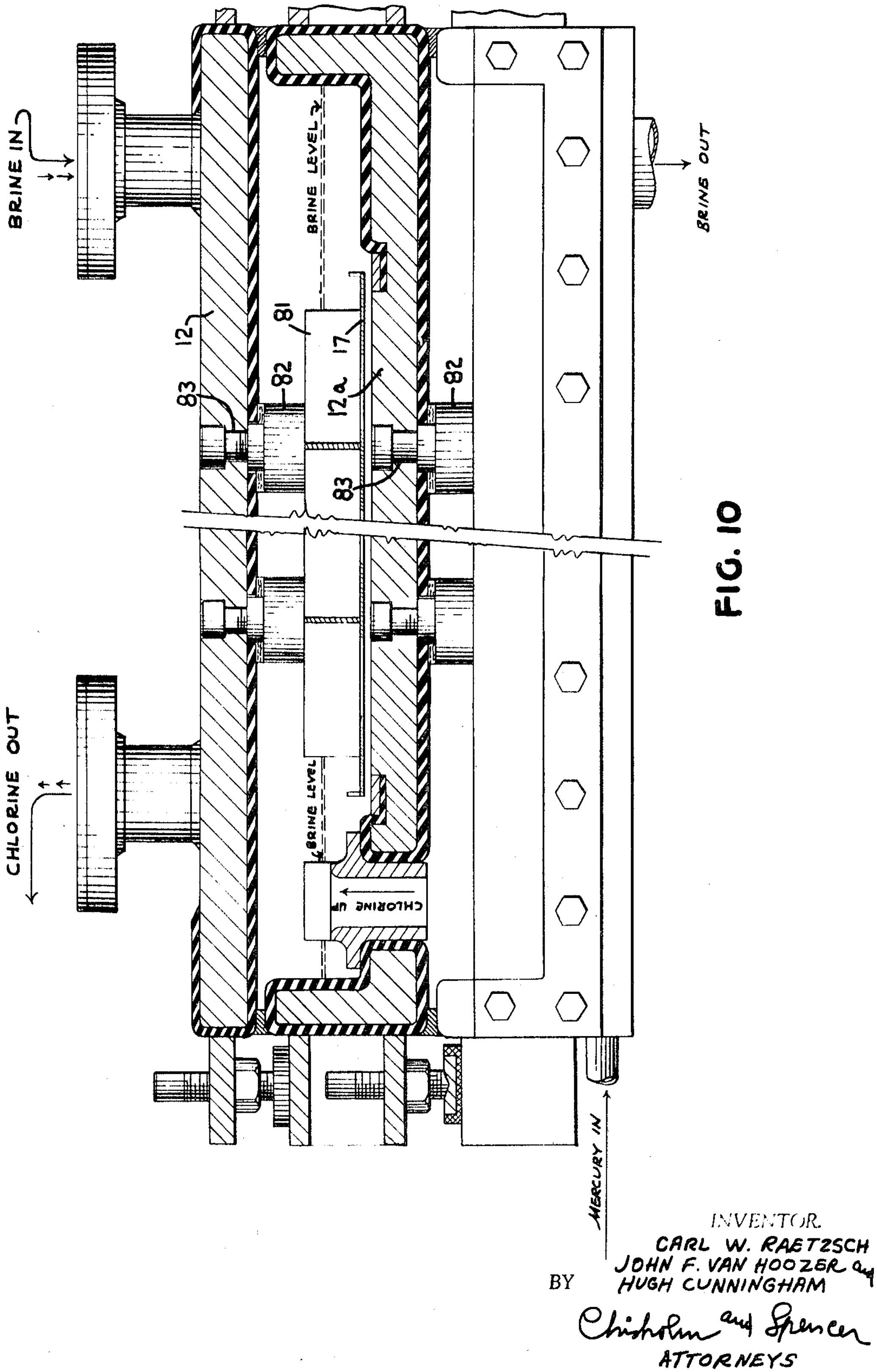
FIG. 10 is a cross-section of the cell of FIG. 2 with the center partially omitted taken along the line I—I, and having a further embodiment of the anode support member of the cell in lieu of the support shown in FIG. 2.
Figure 11:
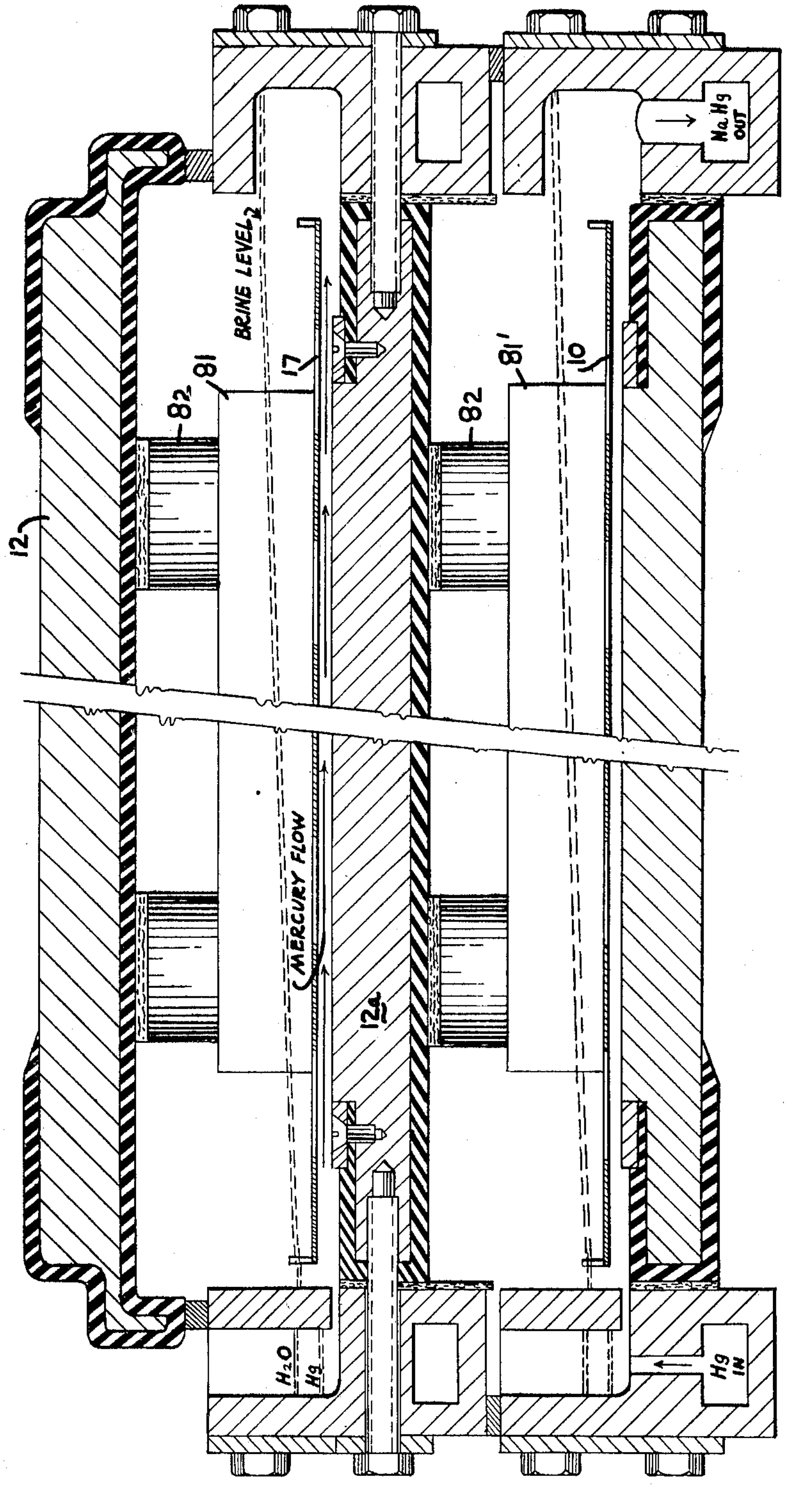
FIG. 11 is a cross-section along lines II—II of the cell of FIG. 2 with the center partially omitted and showing the anode support modification of FIG. 10 in lieu of the anode support member of FIG. 2.

Turning now to FIGS. 10 and 11, there is shown another modification of the anode 17 of the cell cover and anode 10 of the cell unit in which the electrical connection and the supporting of the anode is accomplished by means of metal plates 81 in lieu of the titanium sheathed copper rods 13 of FIGS. 3 and 4. In this modification, titanium lugs 82 are affixed to the backing plates 12 and **12*a* of the anodes of the cell cover 1 and cell unit 7, respectively, and have attached to them through a suitable screw member 83 a plurality of metal plates 81 and 81′ which are suitably welded to the upper portion of the anodes 17 and 10. A plurality of these metal plates 81 and 81′ are placed across the back of the anodes 17 and 10 to provide suitable electrical distribution to the face of the anodes 17 and 10 to prevent these anodes from warping during cell operation. The relationship of the brine feed lines 5 and 5′, chlorine outlets 4 and 4′, and mercury feed lines 25 and 26 remain the same in this modification, the essential difference between this modification and those shown in FIGS. 3 and 4 being in the electrical connection to the anodes 17 and 10. The structure of the distributors 27 and 29, sumps 30 and 31, and the trays 9 and 11** and all other equipment is essentially the same as described with reference to the embodiment shown in FIGS. 3 and 4.

Figure 6:
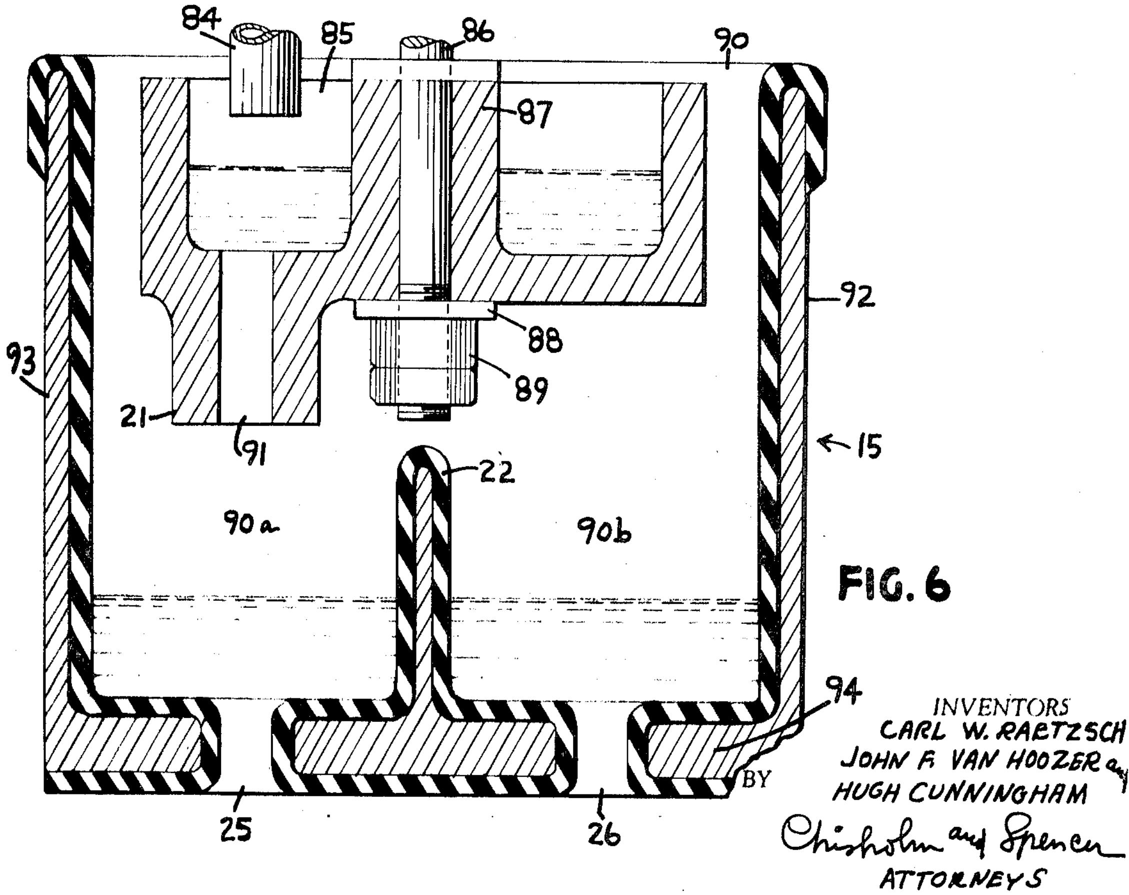
FIG. 6 is a cross-section of the mercury feed splitter 15 shown in FIG. 1.

Turning now to FIG. 6, the mercury splitter 15 of FIG. 1 is shown in cross-sectional detail. This splitting device 15 is comprised of a mercury inlet tube 84 which extends into a cavity 85 formed in the center of the device and which rotates around shaft member 86. Shaft 86 is positioned in a suitable housing 87 and held firm by washer 88 and nut 89. A depending nozzle 21 communicates through a channel 91 with the cavity 85. The nozzle 21 rotates in a chamber 90 formed by the sides 92 and 93, and bottom 94 of the splitter 15. The bottom member 94 of the container is diveded by a member 22 which rises vertically in the center of the splitter 15 and serves to equally divide mercury entering through the nozzle 21 between chambers **90*a* and 90*b*. All portions of the splitter 15 which are in contact with the mercury are rubber covered by rubber linings to provide adequate insulation and assist in breaking the electrical current between the mercury located in each of the individual sections of the splitter 15. The outlets 25 and 26 of the splitter 15 feed the two individual cells shown in FIG. 1 through the distributor members 27 and 29. While only two feed units are shown feeding two cells in this figure and in FIG. 1, it is, of course, to be understood that a multiplicity of these cells may be employed, in which case the splitter 15** would be divided into a sufficient number of individual feed units to provide an individual mercury cell feed for each individual mercury cell employed.

Figure 7:
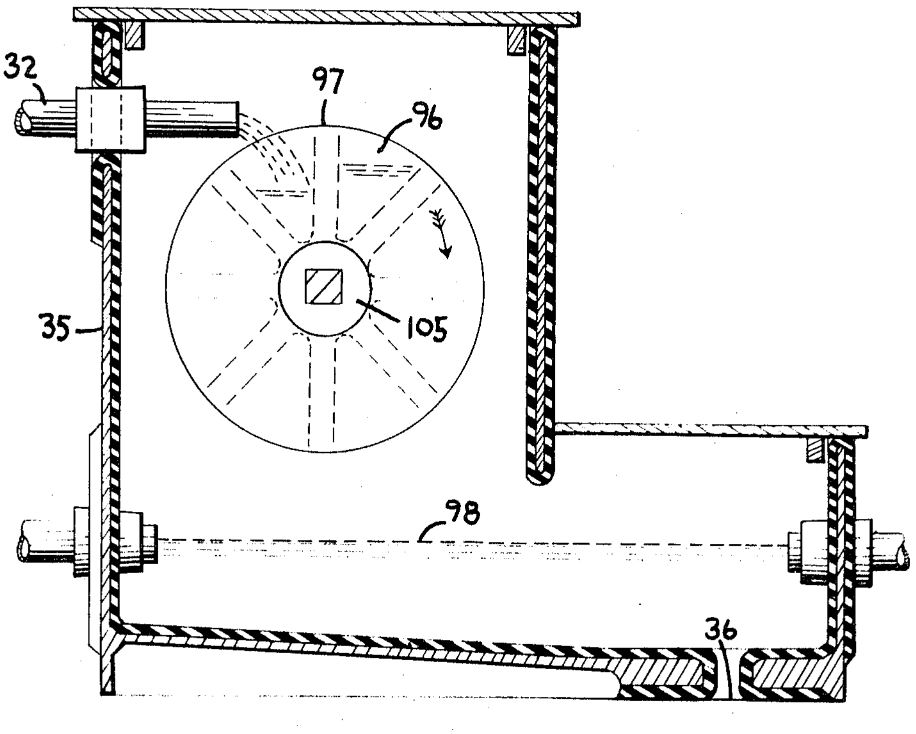
FIG. 7 is a cross-section of the amalgam splitter 35 of FIG. 1, taken along the mid line III—III of FIG. 1.
Figure 8:
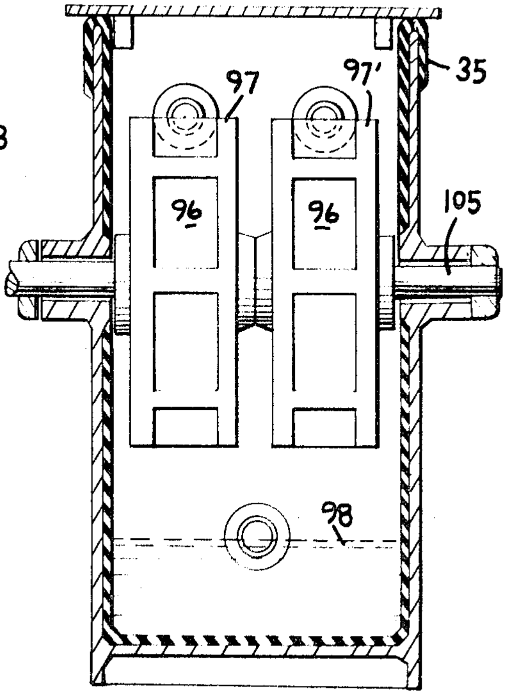
FIG. 8 is a section of the amalgam splitter 35 of FIG. 1, taken along lines IV—IV, showing the details of the lining of the splitter.

Turning to FIGS. 7 and 8, the sodium-mercury amalgam leaving the electrolytic cell is introduced into the splitting device 35 of FIG. 1. This device is shown in two sectional views in FIGS. 7 and 8. In FIG. 7, sodium-mercury amalgam leaving the cell through line 32 enters unit 35 and is dropped into one of the compartments 96 of the compartmented wheels 97 and 97′. As each compartment 96 becomes filled, on the principle of the water-wheel, the mercury amalgam pushes the water-wheels in a clockwise direction, thus electrically splitting it and dropping it into the sump 98, from which it is removed via outlet 36 and introduced into the mercury amalgam denuder 37.

Figure 12:
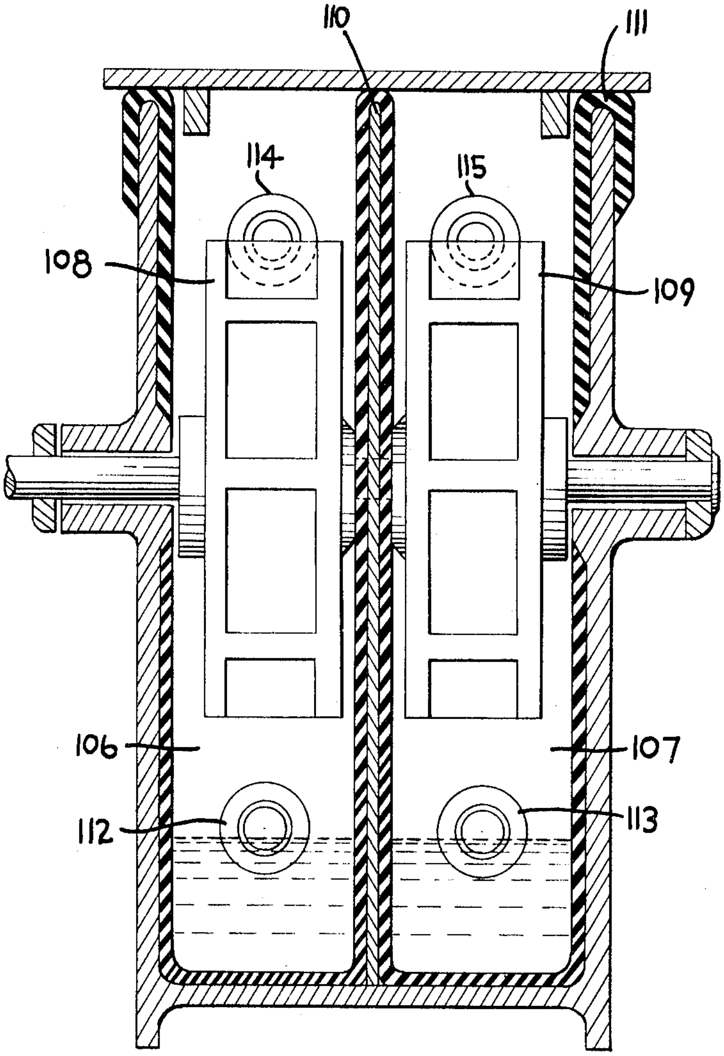
FIG. 12 is a further embodiment of a mercury splitter which may be used in lieu of splitter 15 shown in FIG. 1.

While the wheel 97 can operate on a water-wheel principle, provision may be made to drive it by coupling shaft member 105 to a suitable motor and belt arrangement. As with the mercury splitter 15, the number of compartmented wheels employed will depend on the number of complete cells employed in the completed cell. FIG. 12 shows a further embodiment of the mercury splitter 15 in which there is provided two sumps 106 and 107. Sump 106 is associated with a wheel 108 and sump 107 with a wheel 109. Wheel 108 is fed through pipe 114 and wheel 109 through pipe 115. The sumps are separated by a wall member 110 and this wall member 110 as well as the walls of the splitter 35 are lined with a rubber lining 111 for insulation purposes. Each sump is provided with an outlet 112 and 113 for feed to the mercury reservoirs 27 and 29. Discharge is accomplished by simple overflow into the open tubes 112 and 113. These open tubes would feed mercury to lines 25 and 26 for ultimate feed to reservoirs 27 and 29, respectively. If desired, of course, bottom feeding can be employed rather than an overflow type as shown in FIG. 12. The mercury fed to pipes 114 and 115 is typically fed from a holding tank (not shown) provided with two discharge orifices located on the bottom or sides, one orifice being connected to each of pipes 114 and 115. As with the splitter 15, this device will be provided with sumps and wheels corresponding to the number of complete cells used in the cell assembly.

Figure 9:
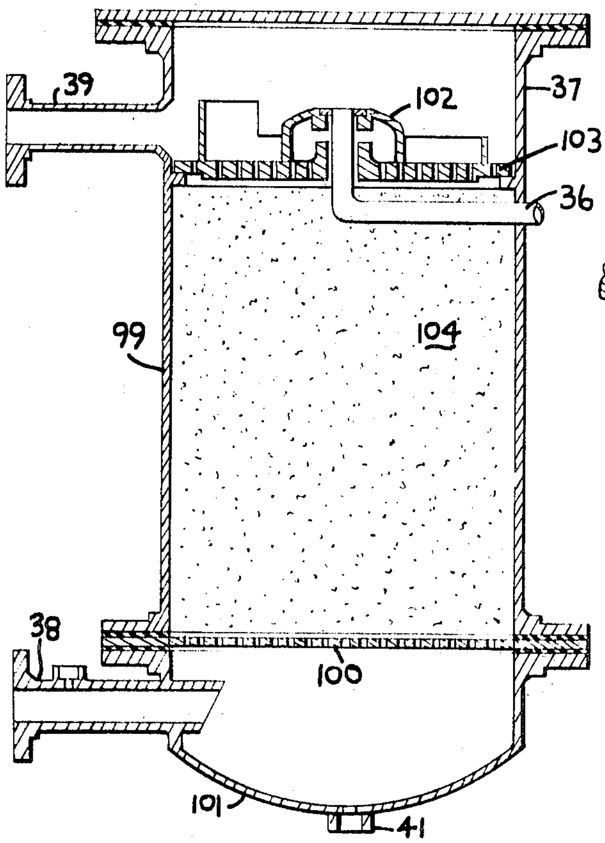
FIG. 9 is a cross-section of the amalgam denuder 37 of FIG. 1, taken along the mid line V—V.

The denuder 37 shown in FIG. 9 in cross-section is comprised of a steel shell 99 having a perforated baffle 100 located at the bottom thereof and a water inlet 38. The bottom member 101 of the denuder is provided with an outlet 41 for the removal of denuded mercury. In the upper portion of the denuder is located an outlet 39 for the removal of caustic soda. Sodium amalgam is introduced through pipe 36 to a baffle member 102 located in the upper portion of the denuder where it flows downwardly through a perforated plate member 103 and in contact with graphite particles 104 located between perforated baffle 100 and the baffle 102. Hydrogen escapes from the cell through a suitable outlet 40, not shown in FIG. 9.

While the invention has been described with reference to the formation of chlorine and sodium-mercury amalgam from brine, it is, of course, possible to utilize the instant cell to manufacture other alkali metal hydroxides from the corresponding alkali metal chloride solution. Thus, KCl can be readily electrolyzed to produce chlorine and potassium-mercury amalgam and ultimately potassium hydroxide. Further, while platinum plated titanium has been shown as the preferred anode material, other noble metals may be utilized as the anode surface and can be placed upon other base materials such as tantalum.

While the invention has been described with reference to certain specific and illustrated embodiments, it is not intended that it be so limited except insofar as appears in the accompanying claims.

We claim:

1. A cell unit comprising an electrically conductive backing plate constructed and arranged to provide on its upper surface a trough like tray, means connected at a side portion of said tray for admitting fluid to said tray, means on the opposite side of said tray to remove liquid admitted at said other side, means on a further side of said tray for admitting a second fluid to said tray, means on the side of said tray opposite said further side for removing said second fluid and passing it to the underside of said backing plate, electrically conductive support members affixed at one extremity to the underside of said backing plate and having affixed to their other extremity a flat, horizontally disposed anode member, said anode member having a titanium base and a noble metal surface.

2. The apparatus of claim 1 wherein said support members comprise titanium covered copper rods.

3. The apparatus of claim 1 wherein said support members comprise titanium plates.

4. A cell unit comprising an electrically conductive backing plate constructed and arranged to provide on its upper surface a trough like tray, means connected at a side portion of said tray for admitting a fluid to said tray, means on the opposite side of said tray for removing fluid admitted at said other side, means on a further side of said tray for admitting a second fluid to said tray, means on the side of said tray opposite from said further side for removing said second fluid through said unit to a point underneath said backing plate, means on said cell unit for adjusting the angle of said trough with respect to a horizontal plane, electrically conductive support members affixed at one extremity to the underside of said backing plate and having affixed to another extremity a flat horizontally disposed anode member, said anode member having a noble metal electrolytic surface.

5. The apparatus of claim 4 wherein said support members comprise titanium plates.

6. The apparatus of claim 4 wherein said support members comprise titanium covered copper rods.

7. The apparatus of claim 4 wherein said backing plate is electrically insulated on its sides and its underside.

8. The apparatus of claim 1 wherein said backing plate is electrically insulated on its side and its underside.

9. An alkali metal chlorine cell having a flowing mercury cathode comprising an enclosed box-like cell assembly having a top, a flat, horizontally disposed anode member depending from said top, a bottom having a trough-like tray on the inside surface thereof facing said anode member and positioned below said anode member, a cell unit positioned between said top and said bottom, said cell unit having an upper surface forming a trough-like tray below said anode member, the bottom surface of said unit having positioned thereon a horizontally disposed anode member positioned above the trough-like tray of said bottom, means for feeding mercury to the tray of said bottom, separate means for feeding mercury to the tray of said unit, means for feeding brine to the tray of said unit at one side thereof, means on another side of said unit tray to remove brine and pass it to the underside of said unit to the tray of said bottom, means to withdraw brine from the tray of said bottom at a side other than the side it enters said tray, separate means on each of said trays to withdraw mercury and means to pass current from the top to the bottom of said assembly and through said unit.

10. An alkali metal chlorine cell having a flowing mercury cathode comprising an enclosed box-like cell assembly having a top, a flat, horizontally disposed anode member depending from said top, a bottom having a trough-like tray on the inside surface thereof, said tray being positioned below said anode member, a cell unit positioned between said top and said bottom, said cell unit having an upper surface forming a trough-like tray below said anode member, the bottom surface of said unit having positioned thereon a horizontally disposed anode member positioned above the trough-like tray of said bottom, means for feeding mercury to the tray of said bottom, separate means for feeding mercury to the tray of said unit, means for feeding brine to the tray of said unit at one side thereof, means on another side of said unit tray to remove brine and pass it to the underside of said unit and to the tray of said bottom, means to withdraw brine from the tray of said bottom at a side other than the side it enters said tray, separate means on each of said trays to withdraw mercury, means for adjusting the angle of said trays with respect to the horizontal in at least two directions and means for passing current from said top to said bottom and through said unit.

11. An alkali chlorine cell having a flowing mercury cathode comprising an enclosed box-like cell assembly having a top, a flat, horizontally disposed anode member depending from said top, a bottom having a trough-like tray on the inside surface thereof, said tray being positioned below said anode member, a cell unit positioned between said top and said bottom, said cell unit having an upper surface forming a trough-like tray below said anode member, the bottom surface of said unit having positioned thereon a horizontally disposed anode member positioned above the trough-like tray of said bottom, means for feeding mercury to the tray of said bottom, separate means for feeding mercury to the tray of said unit, means for feeding brine to the tray of said unit, means for passing brine across the tray of said unit and at an angle to the mercury flow thereon to a brine outlet positioned on a side of said tray other than the brine feed side, means to pass brine downwardly to one side of the tray of said bottom, and across said bottom tray at an angle to the mercury flow on said bottom tray, means on a side of said bottom tray other than the brine feed side for removing brine, separate means for removing mercury from each of said trays, means for electrically splitting said separate mercury streams and means for passing current from said top to said bottom and through said unit.

12. An alkali metal chlorine cell having a flowing mercury cathode comprising an enclosed box-like cell assembly having a top, a flat, horizontally disposed anode member depending from said top, a bottom having a trough-like tray on the inside surface thereof, said tray being positioned below said anode member, a plurality of cell units positioned in between said top and said bottom, the upper surface of each of said units having trough-like trays thereon and being positioned in said assembly with their trays facing said anode member, the bottom surface of each of said units having positioned thereon a flat, horizontally disposed anode member and being positioned in said assembly with their anode members facing the tray of said bottom, means for feeding mercury to the tray of said bottom, separate means for feeding mercury to each of the trays of said units, means for feeding brine to the upper tray of said cell assembly at one side thereof, means for removing brine from the upper tray of said cell assembly at a different side thereof, means on said different side to pass the brine to the next lower tray on one side of said next lower tray, the brine inlets and outlets on each tray of said units being arranged so that brine flows across each unit tray from inlet to outlet and at an angle to the flow of mercury, means on the tray of said bottom on a side other than the brine inlet side for removing brine from said assembly, separate means on each of the trays of said assembly for removing mercury and means for passing current from the top of said cell assembly to the bottom and through said units.

13. A method of electrolyzing alkali metal chloride to produce elemental chlorine and alkali metal hydroxide in an electrolytic alkali metal chlorine mercury cell assembly having a plurality of electrolytic cells therein positioned one above the other and connected in electrical series and wherein each cell is provided with a flat horizontally disposed anode positioned above a tray suitable for containing flowing mercury, comprising feeding separate streams of mercury to each tray of each cell in the assembly, and removing the mercury from each tray of each cell in separate streams, feeding brine to the top cell in said assembly on one side thereof and passing it across the tray transversely to the mercury flow, removing brine from the tray on another side thereof and passing it to the tray below on one side thereof and across the next lower tray transversely to the mercury flow on another side thereof, and continuing passage of the brine through the cell in this manner unit the brine flows over the lowest tray in said assembly and transversely to the mercury flow thereon and removing the brine from a side other than the feed side of said lowest tray and from the cell assembly.

14. The apparatus of claim 9 wherein means are provided to electrically insulate said unit from said top and said bottom.

15. The apparatus of claim 10 wherein means are provided to electrically insulate said unit from said top and said bottom.

16. The apparatus of claim 11 wherein means are provided to electrically insulate said unit from said top and said bottom.

17. The apparatus of claim 12 wherein means are provided to electrically insulate said cell units from each other and from said top and said bottom.

18. A method of electrolyzing alkali metal chloride to produce elemental chlorine and alkali metal hydroxide in an electrolytic alkali metal chlorine mercury cell assembly having a plurality of electrolytic cells therein positioned one above the other and connected in electrical series and wherein each cell is provided with a flat horizontally disposed anode positioned above a tray suitable for containing flowing mercury, comprising feeding separate streams of mercury to each tray of each cell in the assembly, and removing the mercury from each tray of each cell in the assembly, and removing the mercury from each tray of each cell in separate streams, feeding brine to a cell in said assembly on one side thereof and passing it across the tray transversely to the mercury flow, removing brine from the tray on another side thereof and passing it to the tray below on one side thereof and across the tray transversely to the mercury flow to another side thereof.

References Cited

UNITED STATES PATENTS

| | | | |
|---|---|---|---|
| 881,108 | 3/1908 | Carrier, Jr. | 204—220 |
| 2,719,117 | 9/1955 | Blue et al. | 204—220 |
| 3,308,047 | 3/1967 | Laub et al. | 204—220 |

JOHN H. MACK, Primary Examiner

D. R. VALENTINE, Assistant Examiner

U.S. Cl. X.R.

204—220, 250